Nov. 4, 1941.  I. R. KUSINITZ ET AL  2,261,770
SPEED INDICATOR
Filed Feb. 23, 1939
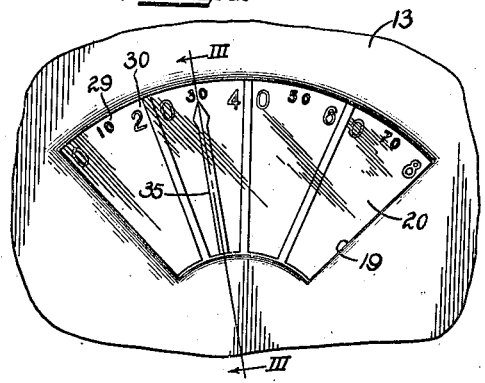
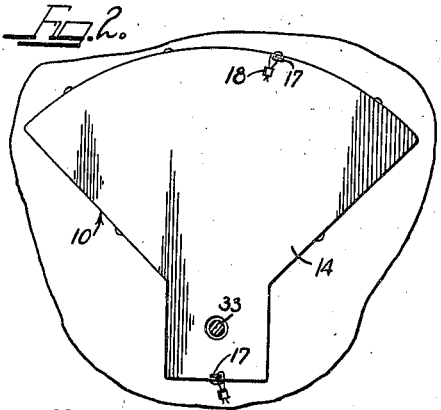
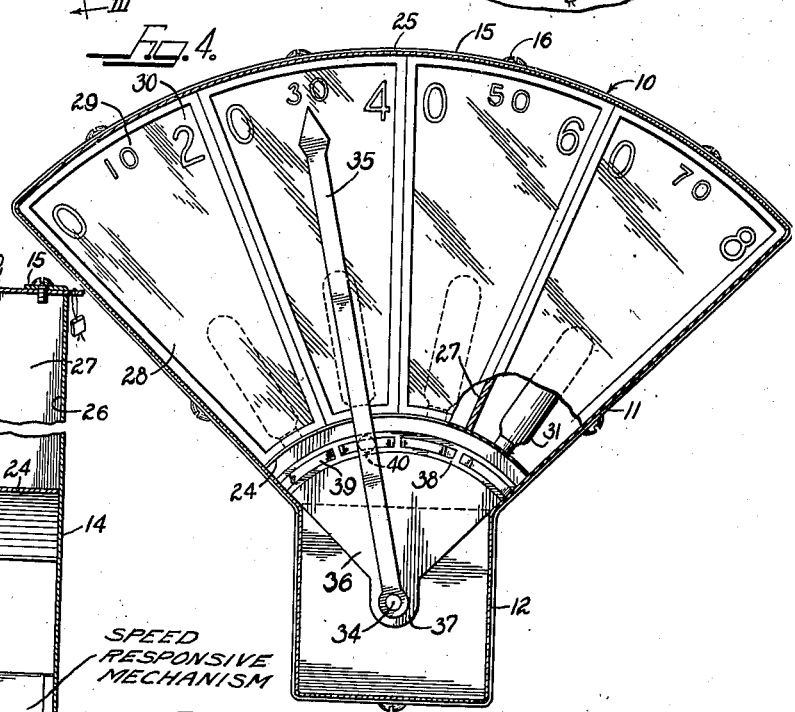
Inventor
IRVING R. KUSINITZ
RAYMOND C. HERCHENROEDER Patented Nov. 4, 1941

2,261,770

UNITED STATES PATENT OFFICE 2,261,770

SPEED INDICATOR

Irving R. Kusinitz and Raymond C. Herchenroeder, Chicago, Ill.

Application February 23, 1939, Serial No. 257,906

2 Claims. (Cl. 177—311.5)

The present invention relates generally to speed indicators and is particularly concerned with indicators which may be utilized on vehicles such as trucks, automobiles, and the like, and is arranged and mounted so as to be readily visible from the exterior of the vehicle to visibly indicate the speed of the vehicle to traffic officers, and other persons.

A further object of the invention is to provide in such an indicator, a housing which may be sealed to prevent access to the working parts of the device by unauthorized persons.

It is also an object of the hereindescribed invention to provide a speed indicator which not only indicates predetermined zone speeds, but also indicates speeds intermediate the zone speeds.

Still another object is to provide an indicator of this type which may be controlled in such a manner as to indicate that the engine of the automobile is running, even though the automobile is not in motion.

Other objects and features of the invention will more fully appear from the following detailed description, taken in connection with the accompanying drawing, which illustrate a single embodiment thereof, and in which:

Figure 1 is a view in elevation showing the device of the present invention as being applied to a panel;

Figure 2 is a rear view of the same;

Figure 3 is an enlarged sectional view taken through the panel and housing for the indicator parts, taken substantially on line III—III of Figure 1;

Figure 4 is an enlarged transverse sectional view taken through the housing of the device, taken substantially on line IV—IV of Figure 3; and, Figure 5 is a view schematically illustrating the electrical connections of the device.

As shown on the drawing:

In the illustrated embodiment of the invention, the parts of the indicator are preferably contained within a housing, as generally indicated at 10.

The housing may be constructed of any suitable material and is preferably formed from sheet metal which may be arranged to provide an upper fan shaped portion 11 and a lower projecting substantially square portion 12 symmetrically disposed at the bottom of the upper portion. The forward side of the housing is closed by a plate member 13 which may constitute a panel support for the housing or may constitute the forward wall of the housing, the housing then being supported in any suitable manner. The rear side of the housing is closed by a plate 14 which may be provided with a peripheral flange 15 for overlapping the adjacent wall portion of the housing, this plate being secured by any suitable means, such as screws 16 extending through the flange and into the housing proper.

It is contemplated that the indicator of the present invention may be mounted in any suitable position outside of the vehicle so as to be viewable by traffic officers or other persons not in the automobile. Preferably the device will be mounted adjacent the usual tail lamp or on the side of one of the fenders. Since it is desirable in a device of this nature to prevent its being tampered with by unauthorized persons, the housing may be readily sealed by providing in the housing wall rearwardly projecting tongues 17 which may project through suitable apertures in the plate 14, these tongues being provided with apertures for the reception of a suitable sealing wire as shown at 18.

As shown in Figures 1 and 3, the upper portion of the plate or wall 13 is provided with a segmental shaped opening 19 which is closed by a glass window 20 supported on its rearward side by means of a supporting bracket 21 affixed to the wall 13, and upper and lower angle members 22 and 23. The angle member 22 may be secured to the housing wall by suitable screws, and the angle member 23 may be secured to the bracket 21 by suitable screws.

The upper portion of the housing is separated from the lower portion by means of an arcuate partition 24 which extends between the divergent walls of the housing and is substantially concentric with the upper wall of the housing, which is generally indicated at 25.

The upper portion of the housing is thus formed into an upper chamber 26, and this chamber is further divided into segmental compartments by means of radially extending partitions 27. The rear ends of these compartments are closed by the plate 14, and the forward ends of the compartments which all open in the same direction, namely, towards the window 20, are closed by a glass window 28 which is rearwardly spaced from the window 20.

As shown in Figures 1 and 4, the window 28 is provided adjacent its upper edge with speed indicating indicia. Certain of the indicia as indicated at 29 are placed centrally of the portions overlying the respective compartments to indicate the speed zones, whereas the intermediate speed indicating indicia between adjacent zones is placed so as to be partly disposed in one zone and partly disposed in the adjacent zone. For example, as shown at 30, the numeral "20" indicating the intermediate speed between the ten mile and thirty mile zones is disposed with the "2" lying in the ten mile zone and the "0" lying in the thirty mile zone.

Each of the compartments has mounted therein an electric lamp 31 supported in a suitable receptacle on the partition 24.

Below the partition 24 there is housed in the lower portion 12 of the housing a speed indicating mechanism 32 having a driving shaft 33 which projects through a suitable aperture in the back plate 14 and may be arranged for connection in any suitable manner as by flexible shaft to a driving gear associated in the usual manner with one of the wheels of the vehicle.

The speed indicating mechanism on its forward side has a shaft 34 which will be rotated in opposite directions by the mechanism as the speed of the vehicle is increased and decreased. This shaft is provided with a hand 35 which extends upwardly between the windows 29 and 28 for movement over the speed indicating indicia and the forward surface of window 28 to indicate the instantaneous speed of the vehicle.

Extending below the partition 24 is a sector shaped bracket 36 having its upper corners secured to the diverging walls of the housing, this bracket projecting into the lower portion 12 of the housing and being provided at its apex with a bearing portion 37 for the shaft 34.

Adjacent the upper edge of the bracket 36 is an arcuate strip of insulation 38 for insulatingly supporting a plurality of contact strips 39 in end-to-end relation, with their adjacent ends slightly spaced apart. It will be noted that the same number of contact strips are provided as there are compartments and that the spaces between the ends of the contacts correspond with the projected partitions 27.

A spring pressed contact 40 is carried by the pointer 35 so that as the pointer is moved, the contact 40 will successively engage the contact strips 39. It will be noted that the contact 40 has a diameter that is greater than the spacing between the adjacently disposed ends of the contact strips 39 so that in passing from one contact strip to the next contact strip the contact 40 may simultaneously make connection with both contact strips.

As shown in Figure 5, one terminal of each of the electric lamps 31 is connected to the same side of a source of electrical energy which might be a battery, as indicated at 41. The other terminal of each lamp is connected to a contact strip 39, these terminals of the lamps being connected to the contact strips in sequence. The contact 40 is electrically connected through a switch 42 to the other side of the battery, and this connection may include a ground circuit.

The switch 42 may constitute contacts associated with the ignition switch of the automobile so that this switch will be closed when the ignition switch is closed and the motor of the automobile is operating, and will be open when the ignition switch is opened and the motor of the automobile is stopped. On the other hand, it is to be understood that the switch 42 might be of any suitable construction so long as it is arranged to be closed when the automobile engine is running and opened when the automobile engine is stopped.

It is preferred that the speed zone areas of the window 20 be of different colors, or if desired the zone areas may be made clear and the lamps be of different colors. For example, the lamp in the compartment for the ten mile zone might be white, the lamp for the thirty mile zone green, the lamp for the fifty mile zone yellow, and the lamp for the seventy mile zone might be red.

Briefly, the operation of the device is as follows:

When the vehicle is stationary, the hand 35 will be disposed at zero speed indicating position. In this position, it will be noted that contact 40 will be in contact with the contact strip 39 of the ten mile speed zone. The white light therein will consequently be on, provided that the motor is running. If the motor is not running, the white light will, of course, not be energized. Thus the device of the present invention serves as an indicator to show whether or not the engine of an automobile which is not in motion is running or stopped. Upon motion of the vehicle, the hand 35 will assume a speed indicating position depending upon the speed at which the vehicle is moving. As the hand is moved from one speed zone to another, the electric lamps corresponding to the zones containing the particular speed will be successively illuminated. Thus a traffic officer or person outside the vehicle may with a single glance note the color of the illuminated area of the plate 28 and will immediately be advised as to the zone speed of the vehicle. The position of the hand 35 over the illuminated area will also give an indication of the instantaneous speed of the vehicle.

Should the particular speed at which the vehicle is moving be an intermediate speed between adjacent speed zones, these adjacent speed zones will both be illuminated. For example, assuming that the speed of the vehicle were forty miles per hour, the green lamp of the thirty mile zone would be illuminated as would also the yellow lamp of the fifty mile zone. Should the speed now be decreased, the thirty mile zone lamp will continue to be energized, while the lamp of the fifty mile zone will be extinguished. Moreover, should the speed be increased the lamp of the fifty mile speed zone will continue to be energized and the lamp of the thirty mile zone deenergized.

From the foregoing description, it will be apparent that the present invention provides an improved indicator for vehicles which is arranged to be mounted so as to be readily visible from the exterior thereof to visibly indicate the speed of the vehicle to traffic officers and other persons; which embodies an improved housing structure which is sealed to prevent access to its working parts by unauthorized persons; which is arranged not only to indicate predetermined zone speeds but also the instantaneous speed of the vehicle as well as to provide a definite indication for intermediate speeds lying between adjacent speed zones; and which also serves as an indicator to apprise persons outside of the vehicle as to whether or not the engine of the vehicle is running, even though the vehicle be stationary.

It is, of course, to be understood that although we have described in detail the preferred embodiment of the invention, the invention is not to be thus limited, but only insofar as defined by the scope and spirit of the appended claims.

We claim as our invention:

1. In a speed indicating device, a speed indicating plate separated into a series of speed zone areas corresponding to predetermined speeds, speed indicating indicia carried by said plate, the indicia for indicating the respective zone area speeds being wholly contained in said areas and the speed indicating indicia for the speed intermediate the speeds to which the adjacent areas correspond, being partly contained in one of the adjacent areas and partly contained in the other of the adjacent areas, an energy source, illuminating means for each of said zone areas, circuit means in connection with said illuminating means and with said source, and switch means responsive to speed and interposed in said circuit means arranged operable to selectively effect illumination of the illuminating means of the zone area corresponding to a particular speed to indicate the particular speed and to selectively effect illumination of the illuminating means of adjacent zone areas to indicate a speed intermediate the speeds to which the adjacent areas correspond.

2. In a speed indicating device, a speed indicating plate separated into a series of speed zone areas corresponding to predetermined speeds, speed indicating indicia carried by said plate, the indicia for indicating the respective zone area speeds being wholly contained in said areas and the speed indicating indicia for the speed intermediate the speeds to which adjacent zone areas correspond being partly contained in one of the adjacent areas and partly contained in the other of the adjacent areas, a pointer responsive to speed and movable in the speed zone areas of the plate to indicate zone area speeds and movable to positions intermediate speed zone areas to indicate speeds intermediate those to which the adjacent zone areas correspond, an energy source, illuminating means for each of said zone areas, circuit means in connection with said illuminating means and with said source, and switch means movable in cooperation with movement of said pointer to selectively effect illumination of the illuminating means of the zone area corresponding to a particular speed indicated by the position of said pointer and to effect illumination of the illuminating means in zone speed areas adjacent to said pointer when it is in position to indicate an intermediate speed.

IRVING R. KUSINITZ.
RAYMOND C. HERCHENROEDER.